(12) United States Patent
Hirokami et al.

(10) Patent No.: US 10,668,902 B2
(45) Date of Patent: Jun. 2, 2020

(54) WHEELIE DETERMINING DEVICE AND WHEELIE DETERMINING METHOD

(71) Applicant: KAWASAKI JUKOGYO KABUSHIKI KAISHA, Kobe-shi, Hyogo (JP)

(72) Inventors: Tatsuya Hirokami, Osaka (JP); Shohei Terai, Akashi (JP); Seiji Azuma, Hyogo (JP); Kengo Ueda, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 228 days.

(21) Appl. No.: 15/701,147

(22) Filed: Sep. 11, 2017

(65) Prior Publication Data

US 2018/0072286 A1 Mar. 15, 2018

(30) Foreign Application Priority Data

Sep. 14, 2016 (JP) .................................. 2016-179705

(51) Int. Cl.
*B60T 8/17* (2006.01)
*B60T 8/175* (2006.01)

(52) U.S. Cl.
CPC ............ *B60T 8/1706* (2013.01); *B60T 8/175* (2013.01); *B60T 2230/03* (2013.01); *B60T 2240/06* (2013.01)

(58) Field of Classification Search
CPC .... B60T 8/1706; B60T 8/175; B60T 2240/06; B60T 2230/03
See application file for complete search history.

(56) References Cited

U.S. PATENT DOCUMENTS

| | | | | |
|---|---|---|---|---|
| 4,735,276 A | * | 4/1988 | Burton | .................... B62K 25/08 180/219 |
| 2011/0160973 A1 | * | 6/2011 | Matsuda | ............... B60T 8/1706 701/70 |
| 2016/0009275 A1 | * | 1/2016 | Hieda | ..................... B60K 28/16 701/70 |
| 2016/0144854 A1 | * | 5/2016 | Watanabe | ............. B60W 30/02 477/185 |
| 2016/0160763 A1 | * | 6/2016 | Matsuda | ............... F02D 9/1095 123/403 |
| 2017/0101008 A1 | * | 4/2017 | Hirokami | ............... B60K 28/10 |
| 2017/0120901 A1 | * | 5/2017 | Igari | ...................... B60W 40/11 |
| 2018/0370506 A1 | * | 12/2018 | Igari | ..................... B60T 8/1706 |

FOREIGN PATENT DOCUMENTS

JP 2011137416 A 7/2011

\* cited by examiner

*Primary Examiner* — Donald J Wallace
(74) *Attorney, Agent, or Firm* — Alleman Hall Creasman & Tuttle LLP (57) ABSTRACT

A wheelie determining device comprises a lift-off start determiner section which determines whether or not a lift-off of a front wheel from a ground surface has started, based on a traveling state value indicating a traveling state of a vehicle and an operation value indicating a rider's driving operation.

9 Claims, 4 Drawing Sheets

WHEELIE DETERMINING DEVICE AND WHEELIE DETERMINING METHOD

CROSS-REFERENCE TO RELATED APPLICATION

This application claims priority to and the benefit of Japanese Patent Application No. 2016-179705 filed on Sep. 14, 2016, the entire disclosure of which is incorporated herein by reference.

BACKGROUND OF THE INVENTION

1. Field of the Invention

The present invention relates to a wheelie determining device and a wheelie determining method.

2. Description of the Related Art

It is known that a wheelie determining device determines whether or not a vehicle is in a wheelie state (a wheelie is occurring in the vehicle) based on a front wheel acceleration rate. JP2011 137416A discloses a technique in which a control for suppressing a driving source power (driving source output) is initiated to terminate a wheelie when it is determined that the vehicle is in the wheelie state.

If determination of start of the wheelie state is delayed, termination of the wheelie is also delayed. However, if it is determined that the vehicle is in the wheelie state based on easy conditions, it may be erroneously determined that the vehicle is in the wheelie state, although the wheelie is not actually occurring.

SUMMARY OF THE INVENTION

In view of the above, an object of the present invention is to advance determination of start of the wheelie while preventing erroneous determination (misdetermination).

According to an aspect of the present invention, a wheelie determining device comprises: a lift-off start determiner section which determines whether or not a lift-off of a front wheel from a ground surface has started, based on a traveling state value indicating a traveling state of a vehicle and an operation value indicating a rider's driving operation.

In accordance with this configuration, the wheelie determining device can determine whether or not the lift-off of the front wheel from the ground surface has started, based on an event occurring at present time, which is indicated by the traveling state value, and an event estimated as occurring at future (later) time in response to the driving operation. Therefore, the determination of the start of the lift-off of the front wheel can be correctly performed at earlier time as necessary, in response to the rider's driving operation.

The rider's driving operation may include a driving operation associated with the lift-off of the front wheel.

In accordance with this configuration, the wheelie determining device can determine whether or not the lift-off of the front wheel from the ground surface has started, in view of a degree of easiness of the lift-off (lift-off trend) of the front wheel at future time which is predicted from the rider's driving operation. For example, in a case where the rider performs the driving operation which causes the front wheel to easily lift-off the ground surface, the wheelie determining device determines at earlier time that the lift-off of the front wheel has started, in view of this driving operation. On the other hand, in a case where the rider performs the driving operation which makes it difficult for the front wheel to lift-off the ground surface, the wheelie determining device does not perform quick determination that the lift-off of the front wheel has started, in view of this driving operation. In this way, it becomes possible to prevent erroneous determination of whether or not the lift-off of the front wheel has started.

The lift-off start determiner section may determine at earlier time that the lift-off of the front wheel has started, as the operation value indicates that the lift-off of the front wheel is more likely to occur.

In accordance with this configuration, in a case where the rider performs the driving operation which causes the wheelie to occur, the wheelie determining device determines at earlier time that the lift-off of the front wheel from the ground surface has started.

The operation value may indicate a change rate over time of a request (command) for increasing power of a driving source.

The change rate over time of the request for increasing the power of the driving source is associated with the degree of easiness of the lift-off of the front wheel at future time. In accordance with the above-described configuration, the wheelie determining device can correctly determine at earlier time that the lift-off of the front wheel from the ground surface has started, in view of the change rate over time of the request for increasing the power of the driving source.

The lift-off start determiner section may determine that the lift-off of the front wheel has started in a case where the traveling state value meets a predetermined lift-off condition, and the lift-off condition may be set based on the operation value.

In accordance with this configuration, since the lift-off condition is variably set based on the operation value, the wheelie determining device can determine at earlier time or later time that the lift-off of the front wheel from the ground surface has started.

The traveling state value may include a rotational acceleration rate of the front wheel, and the lift-off condition may include a front wheel acceleration rate condition in which the rotational acceleration rate of the front wheel is equal to or less than a threshold, the operation value may indicate a change rate over time of a request for increasing power of a driving source, and the lift-off start determiner section may set the threshold to a smaller value as the change rate over time of the request for increasing the power of the driving source is greater.

In a basic determination method in the above-described configuration, the wheelie determining device monitors the rotational acceleration rate of the front wheel and determines whether or not the lift-off of the front wheel from the ground surface has started based on the monitored rotational acceleration rate. The rotational acceleration rate of the front wheel exhibits a unique change around the time when the front wheel is about to lift-off the ground surface. Therefore, by considering the rotational acceleration rate of the front wheel, the wheelie determining device can determine whether or not the lift-off of the front wheel from the ground surface has started, with a higher accuracy. As the change rate over time of the request for increasing the power of the driving source is greater, the threshold to be compared to the rotational acceleration rate of the front wheel is smaller. In a situation in which the change rate over time of the request is great and the wheelie is highly likely to occur, the wheelie determining device can accurately determine at earlier time that the lift-off of the front wheel from the ground surface has started. This makes it possible to prevent occurrence of the wheelie and terminate the wheelie at earlier time.

The traveling state value may include a front wheel state value indicating a state of the front wheel, and an estimated value of power of a driving source, and the lift-off start determiner section may determine whether or not the lift-off of the front wheel has started, based on the front wheel state value and the estimated value of the power of the driving source.

In accordance with this configuration, the wheelie determining device can easily determine whether or not the lift-off of the front wheel from the ground surface has started, in view of the power of the driving source.

The wheelie determining device may further comprise a wheelie amount calculation section which calculates as a wheelie amount which is an amount of the lift-off of the front wheel from the ground surface, a change amount of an angle of a vehicle body in a rotational direction in which the front wheel is away from the ground surface after a time point at which the lift-off start determiner section has determined that the lift-off of the front wheel has started.

The wheelie determining device may further comprise a power suppressing section which suppresses power of a driving source based on the wheelie amount.

According to another aspect of the present invention, a method of determining occurrence of a wheelie in a vehicle, comprises determining whether or not a lift-off of a front wheel from a ground surface has started, based on a traveling state value indicating a traveling state of the vehicle and a lift-off trend value indicating a degree of easiness of the lift-off of the front wheel from the ground surface.

In accordance with this method, it can be determined at earlier time that the wheelie has started while preventing erroneous determination.

The above and further objects, and advantages of the invention will more fully be apparent from the following detailed description with reference to the accompanying drawings.

DETAILED DESCRIPTION OF THE EMBODIMENTS

Hereinafter, the embodiments of the present invention will be described with reference to the drawings. Throughout the drawings, the same or corresponding constituents are designated by the same reference symbols, and will not be described in repetition. The directions stated below are from the perspective of a rider riding in a vehicle. A forward and rearward direction corresponds with a vehicle length direction, while a rightward and leftward direction corresponds with a vehicle width direction.

Figure 1:
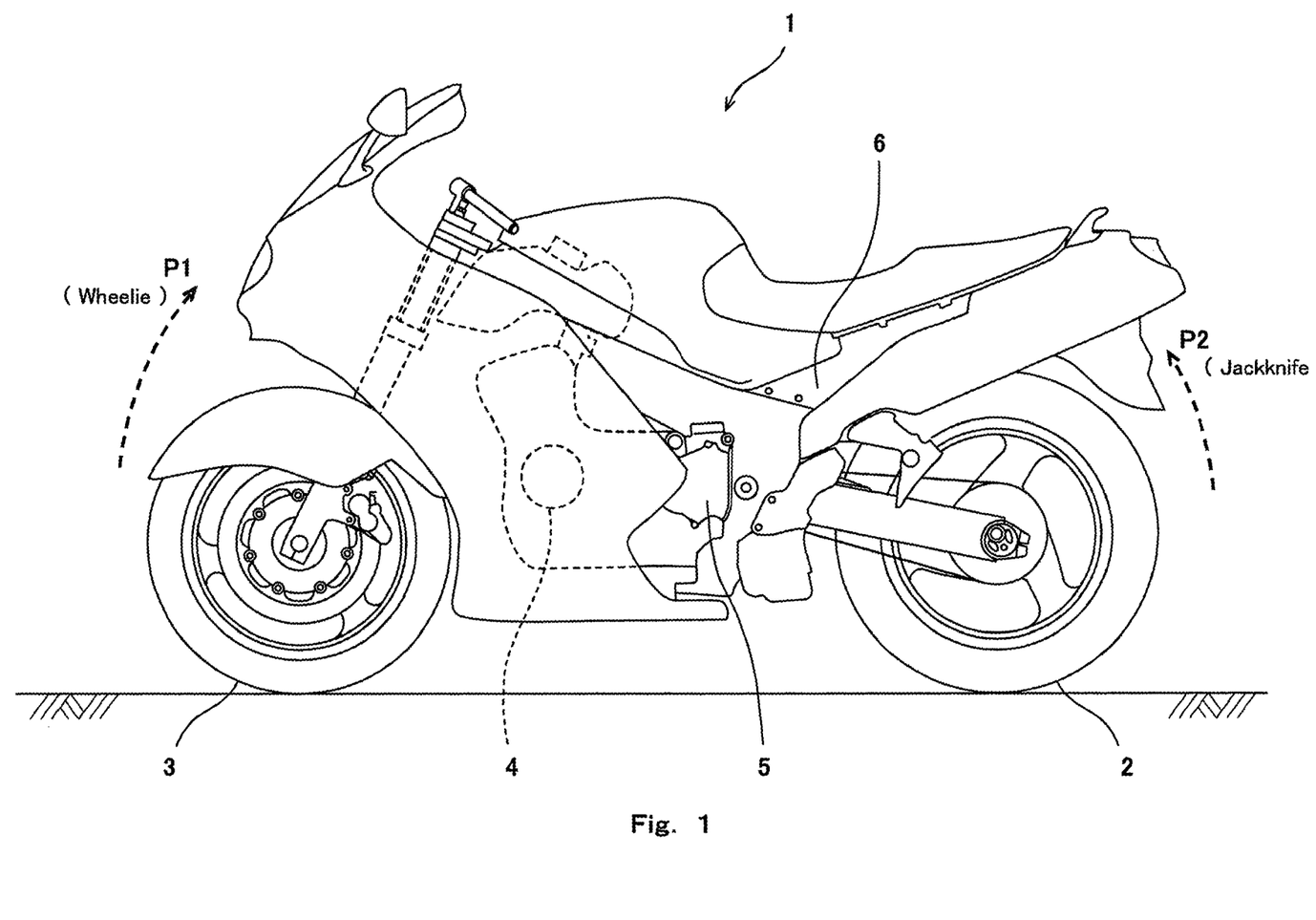
FIG. 1 is a left side view of a motorcycle which is an exemplary vehicle.

Referring now to FIG. 1, a vehicle 1 includes wheels 2, 3, and a driving source 4. The rear wheel 3 is driven by driving power generated by the driving source 4. The driving source 4 is an engine, an electric motor, or a combination of the engine and the electric motor. The driving power generated by the driving source 4 is transmitted to the rear wheel 3 via a driving power transmission mechanism 5. The vehicle 1 includes a wheelie determining device 10.

A motorcycle which is exemplarily shown as the vehicle 1 includes one front wheel 2 and one rear wheel 3. A wheel base between the front wheel 2 and the rear wheel 3 is small, and a power-to-weight ratio [W/kg] is relatively high. For this reason, a lift-off of the front wheel 2 from a ground surface, namely, a wheelie, or a lift-off of the rear wheel 3 from the ground surface, namely, a jackknife, tends to occur in the motorcycle. Therefore, the motorcycle which is a straddle vehicle is a suitable example of the vehicle 1 including the wheelie determining device 10.

The term "wheel lift-off amount" refers to an amount indicating to what extent the front wheel 2 or the rear wheel 3 is away from the ground surface. In a case where the wheel which is lifting-off the ground surface is the front wheel 2, the "wheel lift-off amount" will be referred to as a "wheelie amount." In a case where the wheel which is lifting-off the ground surface is the rear wheel 3, the "wheel lift-off amount" will be referred to as a "jackknife amount."

While the front wheel 2 is lifting off the ground surface (the wheelie amount is increasing), a vehicle body 6 is angularly displaced in a rotational direction P1 (e.g., in a clockwise direction in a left side view) in which the front wheel 2 is away from the ground surface, around an imaginary angular displacement axis extending in the vehicle width direction and passing through a point on which the rear wheel 3 is grounded on the ground surface. In contrast, while the rear wheel 3 is lifting-off the ground surface (the jackknife amount is increasing), the vehicle body 6 is angularly displaced in a rotational direction P2 (e.g., in a counterclockwise direction in a left side view) around an imaginary angular displacement axis extending in the vehicle width direction and passing through a point on which the front wheel 2 is grounded on the ground surface. Hereinafter, the angular displacement of the vehicle body 6 around the imaginary angular displacement axis extending in the vehicle width direction will be referred to as a "pitch", and the rotational angle of the vehicle body 6 around this angular displacement axis will be referred to as a "pitch angle."

Figure 2:
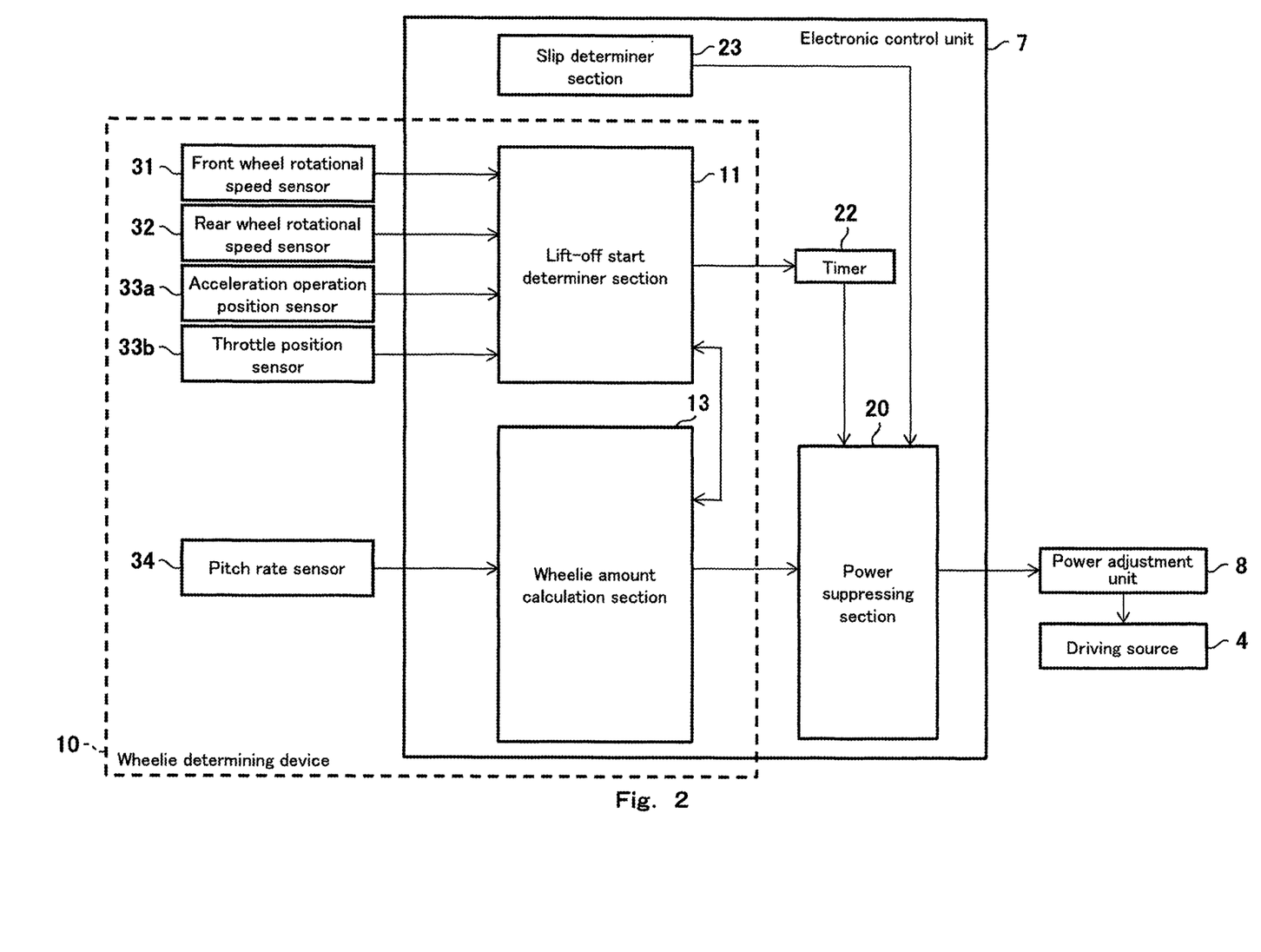
FIG. 2 is a block diagram showing a control system of the vehicle including a wheelie determining device.

As shown in FIG. 2, the wheelie determining device 10 includes a lift-off start determiner section 11 and a wheelie amount calculation section 13.

(Determination of Start of Lift-off)

Figure 3:
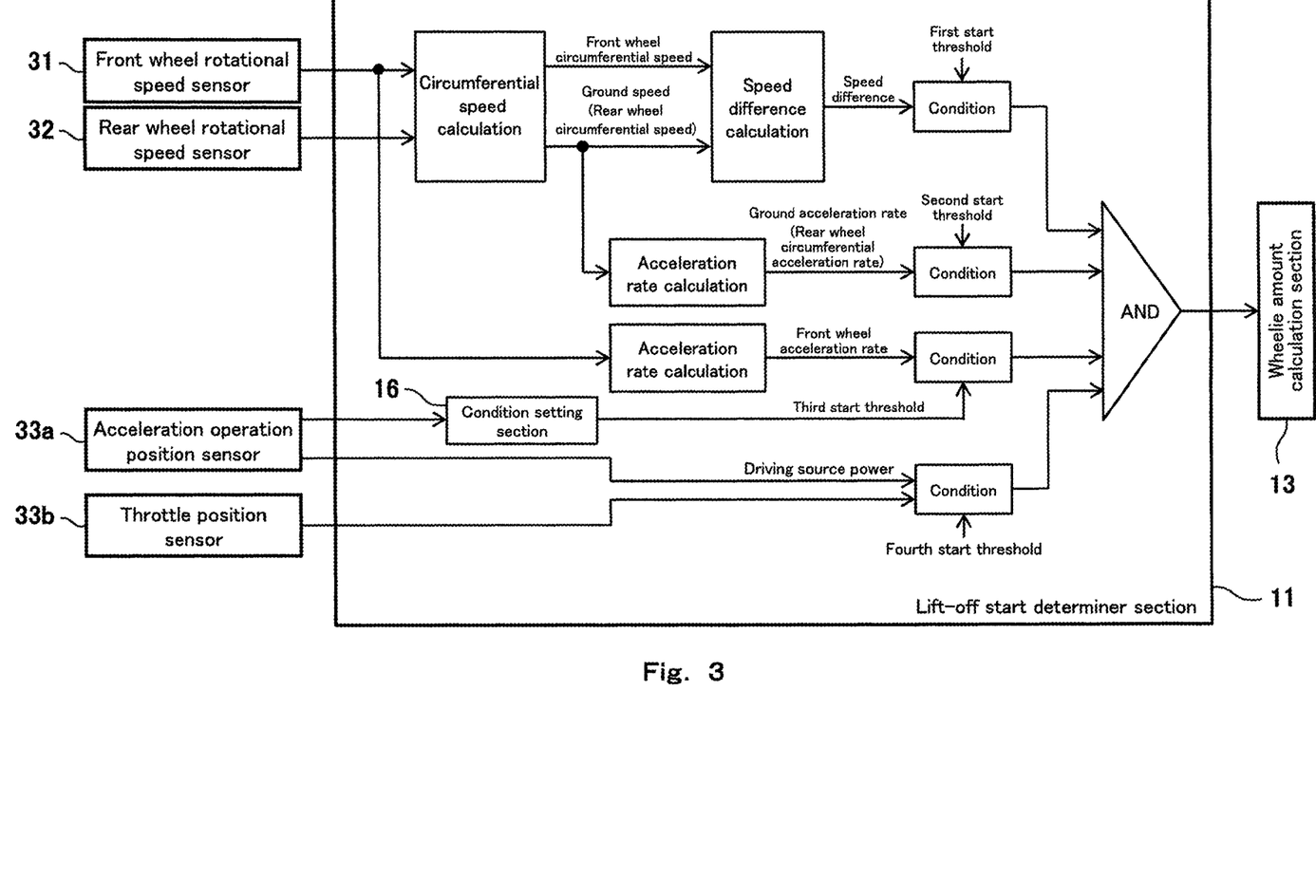
FIG. 3 is a block diagram showing a configuration and processing of a lift-off start determiner section.

The lift-off start determiner section 11 determines whether or not the lift-off of the front wheel 2 from the ground surface has started, based on "traveling state value" indicating a predetermined traveling state, and "lift-off trend value" indicating a degree of easiness of the lift-off of the front wheel 2 from the ground surface. In particular, in a case where the traveling state value meets a predetermined "lift-off condition," the lift-off start determiner section 11 determines that the lift-off of the front wheel 2 has started. The lift-off condition is variably set based on the lift-off trend value. Hereinafter, this will be specifically described.

The "traveling state value" includes parameters associated with a traveling speed such as the speed of the wheel 2, 3 and the speed of the vehicle body 6, and parameters associated with the operation of the driving source 4 such as the power (output) or driving power of the driving source 4. The "lift-off trend value" includes parameters associated with the degree of easiness of the lift-off of the front wheel 2, except the traveling state value. The "lift-off trend value" includes "operation value" indicating the rider's driving operation. The "traveling state value" is the parameter indicating an event which is currently occurring in the wheel 2, 3 or the driving source 4. In response to the rider's driving operation, the driving source 4 operates, and correspondingly the wheel 2, 3 operates. From this point of view, the "operation value" may be regarded as the parameter indicating what event will occur in the wheels 2, 3 or the driving source 4 at future (later) time, as well as the parameter indicating the rider's driving operation which is currently performed.

While the front wheel 2 is starting to lift-off the ground surface, it is highly likely that the power of the driving source 4 is great, great driving force is transmitted from the driving source 4 to the rear wheel 3 which is a drive wheel, and a ground speed and a ground acceleration rate are high. Once the front wheel 2 lifts off the ground surface, the front wheel 2 rotates by inertia in a state in which the front wheel 2 is applied with an air resistance or a friction with an axle, and the rotational speed and circumferential speed of the front wheel 2 are gradually reduced. In view of such a situation, the traveling state value is chosen and the lift-off condition is set.

The "traveling state value" is, for example, (1) difference between the ground speed and the circumferential speed of the front wheel 2. The "traveling state value" is, for example, (2) ground acceleration rate. The "traveling state value" is, for example, (3) rotational acceleration rate of the front wheel 2. The "traveling state value" is, for example, (4) power (output) of the driving source 4. The "ground speed" refers to a movement speed [m/s] of the vehicle body 6 with respect to the ground surface. The "ground acceleration rate" refers to a movement acceleration rate [m/s$^2$] of the vehicle body 6 with respect to the ground surface. The "circumferential speed" refers to a speed of a rotating object at an arbitrary radial position. To derive the circumferential speeds of the wheels 2, 3, a wheel tread may be set as the radial position.

In association with the traveling state values (1) and (3), the wheelie determining device 10 includes a front wheel rotational speed sensor 31 which is attached on the front wheel 2 to detect the rotational speed of the front wheel 2. The lift-off start determiner section 11 receives as input a detection value from the front wheel rotational speed sensor 31 and derives the circumferential speed and rotational acceleration rate of the front wheel 2, based on the received detection value.

In association with the traveling state values (1) and (2), the wheelie determining device 10 may measure the ground speed and the ground acceleration rate, based on a detection value of a sensor which uses a radio wave, such as a GPS sensor. The lift-off start determiner section 11 may estimate the ground speed and the ground acceleration rate, based on the circumferential speed of the rear wheel 3. In other words, in the traveling state values (1) and (2), the ground speed and the ground acceleration rate may be replaced by the circumferential speed and circumferential acceleration rate of the rear wheel 3, respectively.

In that case, to derive the circumferential speed and circumferential acceleration rate of the rear wheel 3, the wheelie determining device 10 includes a rear wheel rotational speed sensor 32 which detects the rotational speed of the rear wheel 3. The lift-off start determiner section 11 receives as an input a detection value from the rear wheel rotational speed sensor 32, and derives the circumferential speed of the rear wheel 3 based on the received detection value. The circumferential acceleration rate can be easily derived based on a current value and a past value (e.g., a previous value sampled at a time point which is one sampling cycle before) of the circumferential speed.

The rear wheel rotational speed sensor 32 may be a sensor which is attached on the rear wheel 3 and detects the rotational speed itself of the rear wheel 3. The rear wheel rotational speed sensor 32 is not limited to such a sensor, and may be a sensor which detects the rotational speed of a rotary member (e.g., an output shaft of the driving source 4 or a rotary shaft included in the driving power transmission mechanism 5) which is rotatable in association with the rotation of the rear wheel 3. The lift-off start determiner section 11 can convert the rotational speed of the rotary member into the rotational speed of the rear wheel 3 by use of a speed ratio of the rotary member to the rear wheel 3. In a case where the lift-off start determiner section 11 estimates the ground speed or the ground acceleration rate by use of the rear wheel rotational speed sensor 32, the lift-off start determiner section 11 can more easily obtain the numeric value of the ground speed or the ground acceleration rate, than in a case where the lift-off start determiner section 11 directly measures the ground speed or the ground acceleration rate based on the detection value of the sensor which uses the radio wave.

The traveling state value (4) may not be a value indicating the power (W) itself of the driving source 4. The traveling state value (4) may be another parameter which significantly affects the power of the driving source 4. The power of the driving source 4 is increased, for example, in a case where the rider inputs an acceleration request (command) (a request for increasing the power of the driving source 4) by use of an acceleration operation unit (e.g., the rider twists an accelerator grip toward an open position or depresses an accelerator pedal toward an open position, and a power adjustment unit 8 for adjusting the power of the driving source 4 is electronically or mechanically operated in response to the acceleration request. The power adjustment unit 8 is different depending on the configuration of the driving source 4. In a case where the driving source 4 includes a spark-ignition engine, the power adjustment unit 8 includes a throttle valve, an injector, and an ignition plug. In a case where the driving source 4 includes an alternating current (AC) motor, the power adjustment unit 8 includes the AC motor and an inverter electrically connected to the AC motor.

In association with the traveling state value (4), the wheelie determining device 10 may include an acceleration operation position sensor 33a which detects the operation position of the acceleration operation unit. In a case where the driving source 4 includes an engine, the wheelie determining device 10 may include a throttle valve position sensor 33b which detects the opening degree of the throttle valve (namely, rotational position of a valving element of the throttle valve). Further, the wheelie determining device 10 may include an air-intake pressure sensor (not shown) which detects an air-intake pressure. The lift-off start determiner section 11 receives detection value(s) from the sensor 33a and/or the sensor 33b in every specified sampling cycle. The magnitude(s) of the detection value(s) correlate(s) with the magnitude of the power of the driving source 4. For this reason, a control can be properly performed by assuming that the detection value(s) from the sensor 33a and/or the sensor 33b as the traveling state value (4).

Alternatively, a slip ratio may be used as the traveling state value (1). The slip ratio S[−] is derived based on the following formula: S=(Vr−Vf)/Vr (Vf is the circumferential speed [m/s] of the front wheel 2 and Vr is the circumferential speed [m/s] of the rear wheel 3). As described above, the ground speed may be replaced by the circumferential speed of the rear wheel 3. Therefore, a factor (Vr−Vf) in the above formula corresponds to the "difference between the ground speed and the circumferential speed of the front wheel 2." Vf may be replaced by the rotational speed [1/s] of the front wheel 2, and Vr may be replaced by the rotational speed [1/s] of the rear wheel 3. The slip ratio is derived in every specified sampling cycle, by use of the detection value input from the front wheel rotational speed sensor 31 and the detection value input from the rear wheel rotational speed sensor 32 in every predetermined sampling cycle. Further, a slip ratio change rate may be used as the traveling state value (1). The slip ratio change rate $\Delta S[1/s]$ is derived according to a formula $\Delta S(n)=(S(n)-S(n-1))/t$ (t is the above-described sampling cycle, S(n) is a present value of the slip ratio S, and S(n−1) is a past value of the slip ratio S, which was obtained at a time point which was one sampling cycle before the time point when the present value S(n) is obtained). A calculation formula of the slip ratio change rate $\Delta S$ contains the "difference between the ground speed and the circumferential speed of the front wheel 2", as a factor. The slip ratio and the slip ratio change rate are measured by use of the front wheel rotational speed sensor 31 and the rear wheel rotational speed sensor 32 which are generally included in the vehicle 1. For the measurement of the slip ratio and the slip ratio change rate, a special or additional sensor is not necessary, which can prevent the configuration of the system from becoming complicated.

The "lift-off condition" includes a first start condition in which the difference (traveling state value(1)) between the ground speed and the circumferential speed of the front wheel 2 is equal to or larger than a first start threshold. The "lift-off condition" includes a second start condition in which the ground acceleration rate (traveling state value (2)) is equal to or larger than a second start threshold. The "lift-off condition" includes a third start condition in which the rotational acceleration rate (traveling state value (3)) of the front wheel 2 is less than a third start threshold. The "lift-off condition" includes a fourth start condition in which the power of the driving source 4 (traveling state value (4)) is equal to or larger than a fourth start threshold.

In the present embodiment, the lift-off start determiner section 11 determines whether or not each of the above-described first to fourth conditions included in the "lift-off condition" is met. For example, the lift-off start determiner section 11 determines that the "lift-off condition" is met when all of the first to fourth start conditions are met. In other words, the wheelie determining device 10 determines that the lift-off of the front wheel 2 from the ground surface has started, when all of the first to fourth start conditions are met.

The "lift-off condition" is set based on a lift-off trend value indicating a degree of easiness of the lift-off of the front wheel 2 from the ground surface. The lift-off trend value includes the operation value indicating a rider's driving operation. The "driving operation" includes a driving operation associated with the lift-off of the front wheel 2 from the ground surface, a driving operation which is likely to cause the lift-off of the front wheel 2 from the ground surface to occur, and a driving operation which causes the front wheel 2 to easily lift-off the ground surface. Under a situation in which the front wheel 2 is beginning to lift-off the ground surface, it is highly likely that great driving force is transmitted from the driving source 4 to the rear wheel 3 as described above. In light of this, as typical examples of the driving operation associated with the lift-off, there are an operation which rapidly changes the operation position of the acceleration operation unit toward the open position, and an operation which causes an increase in the power of the driving source 4. As examples of the operation value indicating the driving operation, there are the operation position of the acceleration operation unit, and a change rate over time (first-order differential value) of the operation position of the acceleration operation unit. These operation values quantitatively indicate the "lift-off trend" (degree of easiness of the lift-off of the front wheel 2 from the ground surface). The lift-off trend is higher as the operation position is closer to a fully open position. The lift-off trend is higher as the change rate over time of the operation position is greater.

In another case where the rider uplifts the front wheel 2 against a gravitational force while the center of gravity of the upper half part of the rider's body is shifted to a rearward position, the front wheel 2 may lift-off the ground surface. As example of the operation value indicating such a driving operation, there are a stroke amount of a front suspension, and a change rate over time of the stroke amount. These operation values also quantitatively indicate the "lift-off trend."

Regarding the lift-off trend value which is not associated with the "operation value," a loaded weight includes the weight of a passenger straddling the vehicle 1 as well as the weight of baggage loaded on the vehicle 1. As described above, the front wheel 2 easily lifts-off the ground surface in a state in which the center of gravity is at a rearward position. Therefore, the lift-off trend is higher as the loaded weight increases. Further, the lift-off trend value includes torque transmitted from the driving source 4 to the rear wheel 3. The transmitted torque can be set based on an engine speed and a gear ratio, as characteristics of the engine as the driving source 4. As the transmitted torque is greater, the lift-off more easily occurs.

The lift-off start determiner section 11 determines at earlier time that the lift-off of the front wheel 2 from the ground surface has started, as the lift-off trend indicated by the lift-off trend value (including the operation value) is higher. More specifically, as the lift-off trend indicated by the lift-off trend value (including the operation value) is higher in a situation in which the traveling state value is equal, the lift-off condition is more eased, and the lift-off condition is met at earlier time.

Figure 4:
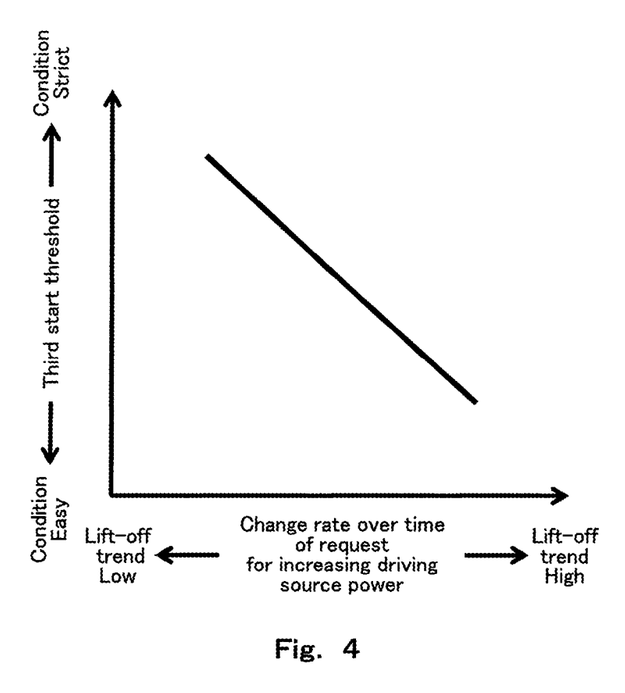
FIG. 4 is a graph showing a relation between an operation value and a threshold.

In the present embodiment, for example, a condition setting section 16 of the lift-off start determiner section 11 sets the third start threshold to be compared to the rotational acceleration rate (traveling state value (3)) of the front wheel 2, based on the change rate of the request (command) for increasing the power of the driving source 4 (change rate over time of the operation position of the acceleration operation unit toward the open position). As the change rate over time of the operation position is higher, the lift-off trend is higher, and the third start condition in which the rotational acceleration rate of the front wheel 2 is less than the third start threshold is more easily met. In light of this, as shown in FIG. 4, the third start threshold is set to a larger value as the change rate over time of the operation position is higher. In this setting, as the lift-off trend is higher, the third start condition included in the lift-off condition is more eased, and thus the third start condition is met at earlier time.

(Calculation of Wheelie Amount, Wheelie Suppressing Control)

When the lift-off start determiner section 11 determines that the lift-off of the front wheel 2 has started, the wheelie amount calculation section 13 calculates as the wheelie amount a change amount of the angle of the vehicle body 6 in the rotational direction (clockwise direction P1 in a left side view) in which the front wheel 2 is away from the ground surface, from that point of time (hereinafter this time point will be referred to as "lift-off start determination time point").

The wheelie amount calculation section 13 sets the wheelie amount to a predetermined reference value at the lift-off start determination time point. The calculated wheelie amount is a sum of the reference value of the wheelie amount and the change amount of the angle of the vehicle body 6. The reference value of the wheelie amount is, for example, zero. In that case, the change amount of the angle of the vehicle body 6 from the lift-off start determination time point is the wheelie amount.

A method of deriving the change amount of the angle of the vehicle body 6 and a specific configuration for deriving the change amount of the angle of the vehicle body 6 are not particularly limited. For example, the wheelie determining device 10 may include a pitch rate sensor 34 which detects a pitch angular velocity. The pitch rate sensor 34 is a rate gyro sensor, and is mounted at a location which is in the vicinity of the center of gravity of the vehicle 1. The wheelie amount calculation section 13 can derive the change amount of the angle of the vehicle body 6 in such a manner that the wheelie amount calculation section 13 receives as inputs the detection values from the pitch rate sensor 34 in succession in specified sampling cycles, and integrates the input detection values. The wheelie amount calculation section 13 performs this integration, by use of the lift-off start determination time point as an integral interval end point and the above-described reference value (e.g., zero) as an initial value.

An inertia sensor other than the rate gyro sensor may be used to derive the change amount of the angle of the vehicle body 6. Instead of the pitch rate sensor 34, the wheelie determining device 10 may include a sensor (integration gyro sensor) which detects a pitch angle, or a sensor (angular acceleration meter) which detects a pitch angular acceleration rate. The angular acceleration meter makes it possible to derive the change amount of the angle of the vehicle body 6 by performing second-order temporal integration of the detection values input in succession in specified sampling cycles, using the above-described reference value (e.g., zero) as the initial value. The integration gyro sensor makes it possible to derive the change amount of the angle of the vehicle body 6 at a time point when the detection value is obtained, by taking a difference between the detection value input in every specified sampling cycle and an initial value which is the detection value at the lift-off start determination time point.

The wheelie determining device 10 may include a sensor which detects a stroke of a rear suspension, and decide as the wheelie amount a change amount of the detection value of this sensor from the lift-off start determination time point. When the front wheel 2 lifts off the ground surface, the stroke is reduced. For this reason, the change amount of the stroke may be used as the pitch angle change amount of the vehicle body 6.

In the present embodiment, the wheelie determining device 10 calculates the change amount of the angle of the vehicle body 6 from the time point when the lift-off start determiner section 11 has determined that the lift-off of the front wheel 2 from the ground surface has started, as the wheelie amount of the vehicle body 6 which is the amount of the lift-off of the front wheel 2 from the ground surface. Therefore, the wheelie determining device 10 can accurately estimate lift-off amount indicating to what extent the front wheel 2 is away from the ground surface, while excluding the influences of the tilt of the vehicle body 6 which occurred before the lift-off start determiner section 11 has determined that the lift-off of the front wheel 2 has started.

The wheelie determining device 10 determines whether or not to initiate a control for suppressing the power of the driving source 4, based on the calculated wheelie amount. For example, the wheelie determining device 10 determines whether or not the calculated wheelie amount is less than a predetermined suppressing control initiation threshold used to initiate a wheelie suppressing control. In a case where the wheelie determining device 10 determines that the calculated wheelie amount is less than the predetermined suppressing control initiation threshold, the wheelie determining device 10 determines that suppressing the power of the driving source 4 to suppress the wheelie should not be performed at the present moment and does not initiate the wheelie suppressing control. On the other hand, in a case where the wheelie determining device 10 determines that the calculated wheelie amount is equal to or greater than the predetermined suppressing control initiation threshold, the wheelie determining device 10 suppresses the power of the driving source 4 to suppress the wheelie (to prevent a situation in which the front wheel 2 is lifting-off to be higher than a certain vertical level).

In a case where the driving source 4 is the spark ignition engine, the wheelie determining device 10 performs the wheelie suppressing control by reducing a throttle valve opening degree, a fuel injection amount, the number of cylinders into which fuel is to be injected, and/or the number of cylinders in which ignition plugs are actuated, and/or retards an ignition timing. In this way, the amount of the power of the driving source 4 which is to be suppressed can be increased.

In the wheelie suppressing control, the power adjustment unit 8 is controlled so that the amount of the power of the driving source 4 which is to be suppressed is increased as the wheelie amount is greater. Alternatively, the power adjustment unit 8 may be controlled so that the amount of the power of the driving source 4 which is to be suppressed is increased as time which passes from the lift-off start determination time point, the time being measured by a timer 22, is longer. This makes it possible to quickly terminate the wheelie even when the extent of the wheelie amount is large. If the wheelie continues for a long time, a difference between the circumferential speed (ground speed) of the rear wheel 3 and the circumferential speed of the front wheel 2 increases. In this case, the circumferential speed of the front wheel 2 rapidly increases to eliminate the difference when the front wheel 2 is grounded on the ground surface, which makes the rider's driving feeling worse. By increasing the amount of the power of the driving source 4 which is to be suppressed, over time, it becomes possible to effectively present the continuation of the wheelie for a long time. As a result, the rider's driving feeling is not worsened.

During the wheelie suppressing control, typically, the wheelie amount increases from the predetermined suppressing control initiation threshold to a certain value, and then decreases from this value, while the front wheel 2 is moving (falling) down toward the ground surface. At a time point when the wheelie amount has decreased to a predetermined suppressing control termination threshold, the wheelie determining device 10 terminates the wheelie suppressing control. The wheelie determining device 10 finishes the calculation of the wheelie amount, and resumes determination of whether or not the lift-off condition is met. In some cases, the wheelie amount decreases to the predetermined suppressing control termination threshold before it reaches the predetermined suppressing control initiation threshold after calculation of the wheelie amount begins. In this case, also, the wheelie determining device 10 finishes the calculation of the wheelie amount, and determines whether or not the lift-off condition is met. When the wheelie determining device 10 determines again that the lift-off condition is met, the wheelie determining device 10 initiates the calculation of the wheelie amount in a state in which the wheelie amount is reset to the reference value.

(Operation)

In the wheelie determining device 10 having the above-described configuration, the wheelie amount is calculated based on the pitch angle of the vehicle body 6 at two stages of processing (determination processes) for determination of the wheelie. The wheelie determining device 10 performs processing at a first stage prior to the calculation of the wheelie amount to determine whether or not the front wheel 2 has shifted from a state in which the front wheel 2 is grounded on the ground surface to a state in which the lift-off of the front wheel 2 from the ground surface has started. The wheelie determining device 10 performs this determination in a state in which the wheel 2, 3 is grounded on the ground surface for a time period for which the vehicle 1 is traveling and the wheelie is not occurring (namely, most of a time period for which the vehicle 1 is traveling), because of the characteristics of the determination.

If the determination process at the first stage (determination of whether or not the lift-off of the front wheel 2 from the ground surface has started) is omitted, then the pitch angle of the vehicle body 6 continues to be measured, and the wheelie determining device 10 determines whether or not the vehicle 1 is in the wheelie state based on the measurement value of the pitch angle of the vehicle body 6, while the vehicle 1 is traveling in a state in which the wheel 2, 3 is grounded on the ground surface. In a case where the pitch angle is measured by integrating the detection values of the pitch rate sensor, a history of the pitch angular velocity is accumulated on the measurement value during the traveling. In contrast, the pitch angle of the vehicle body 6 may change due to factors which are other than the lift-off of the wheel 2, 3 from the ground surface, such as a slope of the ground surface. For this reason, the measurement value of the pitch angle includes a history of the pitch angular velocity of the vehicle body 6 which is generated due to the factors other than the wheelie, and may not sometimes accurately reflect an actual pitch angle. Even when the measurement value of the pitch angle accurately reflects the actual pitch angle, the measurement value becomes a value as if the wheelie occurred, in a situation in which the vehicle begins to travel on an upward slope and the front wheel 2 is not away from the ground surface.

If the determination process at the second stage is omitted, the wheelie determining device 10 determines whether or not the vehicle 1 is in the wheelie state, primarily based on the traveling state value. The rotational speed of the wheel 2, 3, which is an example of the traveling state value, has a relation with an event that the vehicle 1 is in the wheelie state. However, it is difficult to derive a wheelie amount with which the extent of the wheelie can be quantitatively evaluated, based on the numeric value of the rotational speed of the wheel 2, 3. Also, the wheelie determining device 10 determines whether or not the vehicle 1 is in the wheelie state, while the wheel 2, 3 is grounded on the ground surface. However, it is difficult to precisely distinguish between a situation where the wheelie is actually occurring in the vehicle and a particular traveling situation (e.g., the rear wheel 3 is significantly slipping), only based on the behavior of the wheel 2, 3. For these reasons, the determination of the wheelie using the rotational speed of the wheel 2, 3 as the parameter has a limitation in accuracy.

In contrast, the tilt of the vehicle body 6 does not easily become the disturbance to the traveling state value such as the rotational speed of the wheel 2, 3 or the power of the driving source 4. Even in a case where the vehicle body 6 is tilted due to a factor which is other than the lift-off of the wheel 2, 3 from the ground surface, it is not likely that the tilt of the vehicle body 6 becomes the disturbance to the rotational speed of the wheel 2, 3 or the disturbance to the power of the driving source 4 in a state in which the wheel 2, 3 is grounded on the ground surface. In addition, the change amount of the pitch angle of the vehicle body 6 can be accurately calculated without being affected by the friction coefficient of the ground surface for a short time period.

In view of the above, in the present embodiment, the wheelie determining device 10 performs the determination process at the first stage based on the traveling state value. This determination process has a limitation in accuracy. However, after the determination process at the first stage, the wheelie determining device 10 performs the determination process at the second stage using the pitch angle. For this reason, the accuracy of the determination process at the first stage is permitted to be low to some extent, in the sense that the determination process at the first stage leads to the beginning of the determination process at the second stage.

In the determination process at the second stage, the change amount of the angle of the vehicle body 6 from a time point when the determination process at the first stage has ended (the lift-off start determination time point) is calculated. From the calculated value of the angle of the vehicle body 6, the influences of the tilt of the vehicle body 6 due to the factors other than the wheelie, such as a change in the slope of the ground surface on which the vehicle 1 traveled before the lift-off start determination time point, is excluded. For example, if the wheelie determining device 10 determines that the lift-off condition is met, while the vehicle 1 is traveling on the upward slope, this slope of the ground surface is absorbed into the reference value. For this reason, the change amount of the angle of the vehicle body 6 from the time point when the determination process at the first stage has ended can be accurately calculated. The change amount of the angle of the vehicle body 6 simply and quantitatively indicates the lift-off amount indicating to what extent the front wheel 2 is away from the ground surface. Therefore, the wheelie determining device 10 can accurately evaluate the extent of the wheelie based on the calculated wheelie amount.

In the present embodiment, the lift-off start determiner section 11 determines whether or not the lift-off of the front wheel 2 from the ground surface has started, based on the traveling state value indicating the predetermined traveling state, and the lift-off trend value indicating the degree of easiness of the lift-off of the front surface 2 from the ground surface. In particular, the lift-off trend value includes the operation value indicating the rider's driving operation. The lift-off start determiner section 11 determines whether or not the lift-off of the front wheel 2 from the ground surface has started, based on the traveling state value and the operation value.

Thus, the lift-off start determiner section 11 determines whether or not the lift-off of the front wheel 2 from the ground surface has started, based on the traveling state value while reflecting the rider's driving operation. This makes it possible to determine whether or not the lift-off of the front wheel 2 from the ground surface has started, in view of the present event attributed to the traveling state and a future event attributed to the lift-off trend (the rider's driving operation). The indication of the start of the lift-off is captured, and delay of the determination of the start of the lift-off can be prevented. As described above, the determination process at the first stage is permitted to be low in accuracy to some extent, and is intended to trigger the determination process at the second stage which can more accurately determine the wheelie state. The lift-off condition is properly eased depending on the degree of easiness of the lift-off, and the wheelie amount can be calculated at earlier time. This makes it possible to prevent a situation in which the calculated wheelie amount has a value smaller than an actual degree of the lift-off of the front wheel 2 from the ground surface.

In particular, in the present embodiment, the lift-off start determiner section 11 determines whether or not the lift-off of the front wheel 2 from the ground surface has started based on the change rate of the request (command) for increasing the power of the driving source 4 (e.g., the change rate of the operation position of the acceleration operation unit toward the open position). By considering this change rate, the lift-off start determiner section 11 can determine at earlier time whether or not the lift-off of the front wheel 2 from the ground surface has started, in light of a situation in which the power of the driving source 4 is highly likely to be rapidly increased at future time.

(Modified Example)

So far, the embodiment of the present invention has been described. The present invention is not limited to the above-described embodiment. The above-described configuration may be changed, added to or deleted from, within a scope of the spirit of the preset invention.

Although in the above-described embodiment, the change rate over time of the operation position of the acceleration operation unit is described as an example of the change rate over time of the request (command) for increasing the power of the driving source 4, this is exemplary, and a change rate over time of the opening degree of the throttle valve moved toward an open position or a change rate over time of an air-intake pressure may be used instead.

Although the threshold to be compared to the rotational acceleration rate of the front wheel 2 is set and changed based on the lift-off trend value or the operation value, a threshold of another condition (the first, second or fourth start condition) may be set and changed based on the lift-off trend value or the operation value. Although the lift-off condition is set based on the operation value, the above-described method of setting and changing the threshold is exemplary. In a case where the operation value indicates a trend that the front wheel 2 is highly likely to lift-off the ground surface, the threshold other than the third start threshold may be set to a smaller value. This makes it possible to prevent delay of the determination of start of the lift-off.

The "traveling state" value may include an engine speed and a pitch angular velocity, in addition to the above-described values (1) to (4). In that case, the "lift-off condition" may include a fifth start condition in which the engine speed is equal to or higher than a fifth start threshold. The fifth start threshold may be a predetermined constant value (e.g., 3000 rpm). By considering the fifth start condition, a running range in which the wheelie is least likely to occur can be excluded from a range over which the determination is performed. The "lift-off condition" may include a sixth start condition in which the pitch angular velocity is equal to or greater than a sixth start threshold. The sixth start threshold is preferably set to a positive value. When the wheelie starts, the pitch angular velocity takes a positive value. By considering the sixth start condition, the running range in which the wheelie is least likely to occur can be excluded from the range over which the determination is performed. Further, the sixth start threshold may be derived based on the change rate over time of the request for increasing the power of the driving source 4 (e.g., the change rate over time of the opening degree of the throttle valve moved toward the open position).

The lift-off condition may include any of the above-described first to sixth start conditions. In a case where the lift-off condition includes multiple conditions, the lift-off condition may be met when all of these conditions are met. In other words, the lift-off condition may not include all of the first to sixth start conditions. For example, the lift-off condition may not include the first start condition associated with the traveling state value (1).

Although the motorcycle is a suitable example of the vehicle, the present invention is applicable to vehicles other than the motorcycle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A wheelie determining device comprising:
   an electronic control unit configured to determine a start of a lift-off of a front wheel of a vehicle from a ground surface, based on a traveling state value indicating a traveling state of the vehicle,
   wherein the electronic unit is configured to:
   calculate a lift-off trend value indicating a degree of easiness of the lift-off of the front wheel from the ground surface, based on an operation value indicating a rate of change over time of a request by a rider's driving operation for increasing power of a driving source of the vehicle,
   change a threshold level of a lift-off condition so as to meet the lift-off condition earlier, as the lift-off trend value increases, and
   determine the start of the lift-off of the front wheel in a case where the traveling state value meets the lift-off condition.

2. The wheelie determining device according to claim 1, wherein the traveling state value includes a rotational acceleration rate of the front wheel, and the lift-off condition includes a front wheel acceleration rate condition in which the rotational acceleration rate of the front wheel is equal to or less than a threshold, and
   wherein the electronic control unit is configured to set the threshold to a larger value as the rate of change over time of the request for increasing the power of the driving source is greater.

3. The wheelie determining device according to claim 1, wherein the traveling state value includes a front wheel state value indicating a state of the front wheel, and an estimated value of power of the driving source, and
   wherein the electronic control unit is configured to determine whether or not the lift-off of the front wheel has started, based on the front wheel state value and the estimated value of the power of the driving source.

4. The wheelie determining device according to claim 1, wherein the electronic control unit is further configured to calculate
as a wheelie amount which is an amount of the lift-off of the front wheel from the ground surface, a change amount of an angle of a vehicle body in a rotational direction in which the front wheel is away from the ground surface after a time point at which the electronic control unit has determined that the lift-off of the front wheel has started.

5. The wheelie determining device according to claim 4, wherein the electronic control unit is further configured to
suppress power of the driving source based on the wheelie amount.

6. The wheelie determining device according to claim 1, wherein the electronic control unit is further configured to:
compare the traveling state value to a threshold to determine whether or not the lift-off of the front wheel has started; and
variably set the threshold according to the rate of change over time of the request for increasing the power of the driving source.

7. The wheelie determining device according to claim 1, wherein the electronic control unit is further configured to:
calculate as a wheelie amount which is an amount of the lift-off of the front wheel from the ground surface, a change amount of an angle of a vehicle body in a rotational direction in which the front wheel is away from the ground surface after a time point at which the electronic control unit has determined that the lift-off of the front wheel has started; and
suppress power of the driving source based on the wheelie amount.

8. A method of determining occurrence of a wheelie in a vehicle, comprising:
calculating a lift-off trend value indicating a degree of easiness of a lift-off of a front wheel of the vehicle from a ground surface, based on an operation value indicating a rate of change over time of a request by a rider's driving operation for increasing power of a driving source of the vehicle,
change a threshold level of a lift-off condition so as to meet the lift-off condition earlier, as the degree of easiness of the lift-off of the front wheel increases, and
determining a start of the lift-off of the front wheel in a case where a traveling state value indicating a traveling state of the vehicle meets the lift-off condition.

9. A wheelie determining device comprising:
an electronic control unit configured to determine a start of a lift-off of a front wheel from a ground surface, based on a traveling state value indicated a traveling state of a vehicle,
wherein the electronic control unit is configured to:
calculate a lift-off trend value indicating a degree of easiness of the lift-off of the front wheel from the ground surface, based on an operation value indicating a stroke amount of a front suspension or a rate of change over time of the stroke amount,
change a threshold level of a lift-off condition so as to meet the lift-off condition earlier, as the degree of easiness of the lift-off increases, and
determine the start of the lift-off of the front wheel in a case where the traveling state value meets the lift-off condition.

* * * * *